United States Patent [19]

Leeson

[11] 3,862,311
[45] Jan. 21, 1975

[54] NOVEL METHOD OF ENHANCING PROGESTATIONAL ENDOMETRIAL PROLIFERATION WITH PROGESTERONE

[75] Inventor: Lewis J. Leeson, Spring Valley, N.Y.

[73] Assignee: Ciba-Geigy Corporation, Greenburgh, N.Y.

[22] Filed: Jan. 5, 1973

[21] Appl. No.: 321,184

Related U.S. Application Data

[62] Division of Ser. No. 133,269, April 12, 1971, abandoned.

[52] U.S. Cl.................. 424/78, 424/238, 424/241, 424/242, 424/243
[51] Int. Cl............................................ A61k 17/00
[58] Field of Search...................... 424/78, 238–243

[56] References Cited
UNITED STATES PATENTS

| | | | |
|---|---|---|---|
| 2,149,005 | 2/1939 | Bockmuhl et al..................... | 424/14 |
| 2,540,253 | 2/1951 | Gakenheimer.................... | 424/78 X |
| 2,698,822 | 1/1955 | Halpern et al...................... | 424/271 |
| 3,308,217 | 3/1967 | Lowy et al.......................... | 264/117 |

FOREIGN PATENTS OR APPLICATIONS 1,083,985   8/1962   Germany

OTHER PUBLICATIONS

Chem. Abst. 47 No. 9563H(1953) Nakagawa "Solubilization of Steroidal Hormones."

Chem. Abst. 49 No. 7754F(1955) Ekwall et al., "Steroid Hormones Solubilized in Aqueous Association Colloid Solutions."

Chem. Abst. 54 No. 3858E(1960) G. Stirner et al., "Preparation of Aqueous Solutions of Progesterone, Testosterone, and Vitamins A, D, G, K, with the aid of Surpactants."

Chem. Abst. 63 No. 18578F(1965) Steinitz et al., "Plasma and Urinary Metabolites of Progesterone-4-14C Administered Orally or Subcutaneously to Rabbits."

Primary Examiner—Shep K. Rose
Attorney, Agent, or Firm—Theodore O. Groeger; Joseph G. Kolodny; John J. Maitner

[57] ABSTRACT

Poorly soluble drugs, when intimately combined with a carrier therefor and a surfactant, demonstrate a remarkably increased in vivo absorption in comparison to the drug alone.

5 Claims, No Drawings

NOVEL METHOD OF ENHANCING PROGESTATIONAL ENDOMETRIAL PROLIFERATION WITH PROGESTERONE

This application is a division of application Ser. No. 133,269, filed Apr. 12, 1971, now abandoned.

The present invention relates to increasing the in vivo absorption of poorly soluble drugs. By increasing the solubility and/or rate of solution of these drugs, certain drugs hitherto thought not to be efficacious when administered orally, now can be absorbed when so administered.

Numerous studies have been made on increasing in vivo absorption of poorly soluble drugs. Some recent examples of such studies are those of Simonelli et al., J. Pharm. Sci., 58 (5), 538–549 (1969), who discussed the increased dissolution rate of sulfathiazole when coprecipitated with polyvinylpyrrolidone. Similarly, Chiou et al., J. Pharm. Sci., 58 (12), 1505–1510 (1969), have found that solubility of the antibiotic griseofulvin is increased when intimately combined with polyethylene glycols.

The defects of these two component (carrier-drug) systems is thought to derive from their instability on storage, due to the existence of a metastable system. This problem was recognized by Allen et al., J. Pharm. Sci., 58 (10), 1190 to 1193 (1969).

Three component systems, wherein a drug is suspended in a medium such as low molecular weight polyethylene glycol and a surfactant to produce a fluid or semi-soft suspension, have been proposed as a general method of formulating any drug but such fluid suspensions have little effect on the improvement of absorption of water-insoluble drugs.

The present invention is directed to a solid, as opposed to a fluid, dosage system, which is not only more stable than the above-discussed two component systems but also is significantly more effective in increasing the solubility of relatively insoluble drugs. Thus, lower amounts of drug can be employed and higher blood levels may also be realized.

Another aspect of this invention is the realization of an orally absorbed progesterone composition which has hitherto been unknown, supposedly due to the poor absorption of progesterone.

In order to achieve the above-described salient features, a solid three-component system has been discovered which provides increased stability and increased in vivo absorption when compared with the drug per se, drug and carrier or fluid three-component (drug-carrier-surfactant) system.

By the incorporation of a pharmaceutically acceptable surfactant with the poorly soluble drug and carrier, the above objectives are met.

In some cases it is necessary to melt the three component mixture to form a solution and then solidify this solution by cooling. Often it is possible to achieve the same effect by dissolving drug, surfactant and carrier in a common solvent, then evaporating the solvent to form a solid. The resultant product of the above methods is a solid molecular dispersion wherein a molecule of the drug is thought to be surrounded by molecules of carrier and surfactant. By starting with a solution formed by melting the components or dissolving them in a common solvent, the insoluble drug breaks down into molecular units to a far greater extent than in a mere fluid suspension.

In a few cases, a simple physical admixture of the above three components produces satisfactory results.

While numerous carriers, such as polyvinylpyrrolidone and other water soluble polymers, urea, succinic acid and water soluble cellulose may be employed, most preferred carriers are the polyethylene glycols or molecular weight range 1,000 to 20,000, and of these the most preferred are in the 4,000 to 6,000 molecular weight range.

While water insoluble and sparingly soluble drugs in general may be used to advantage, this invention has been especially useful with progesterone. Other drugs which may be advantageously employed include phenylbutazone, oxyphenylbutazone, N-(1-adamantanoyl)-O-aminophenylacetic acid, indomethacin, hydrocortisone, prednisone, prednisolone, triamcinolone and its acetonide, griseofulvin, meprobamate, aspirin and 5H-dibenz[b,f]azepine-5-carboxamide.

With respect to suitable surfactants, a prime criterion is pharmaceutical acceptability and while nonionics, anionics and cationics have been successfully employed, the nonionics are most preferred.

Among the suitable nonionics may be mentioned the Tween series 20 to 85, manufactured by Atlas Chemicals, which substances are fatty esters of polyoxyethylene sorbitan and the Pluronic series, e.g., Pluronic F-68 approx. M.W. 8200, manufactured by Wyandotte Chemical Co. The latter materials are polycondensates of ethylene oxide and a hydrophobic base formed by condensation of propylene oxide and propylene glycol and have a general formula:

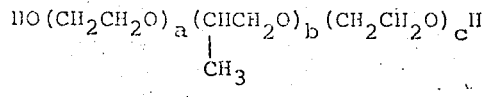

The basic unit has a molecular weight of about 1,501 to 1,800 and the overall average molecular weight is about 8,200 for Pluronic F-68. The ethylene oxide occupies 80 to 90% of the polycondensate.

Among the anionics may be mentioned sodium lauryl sulfate and GAFAC RE-610 phosphate ester surfactant, manufactured by General Aniline and Film Corp.

Among the cationics may be mentioned the Arquad and Ethoguad surfactants manufactured by Armour and dioctyl sodium sulfosuccinate.

The Pluronic series nonionics are most preferred.

The ranges of drug:surfactant:carrier employed are dependent to the greatest extent on the drug and the therapeutic use intended. Thus, amounts of surfactant between 1 and 50 percent of the total weight of the three components and amounts of carrier between 35 and 90 percent may be employed; however, as a practical matter, amounts of surfactant of about 10 percent have proven satisfactory. A convenient working weight ratio for many drugs is 10 parts surfactant:30 parts drug:60 parts carrier. Where the proportion of carrier to surfactant is too low, the desired degree of dispersion of the drug may not be achieved.

One of the outstanding applications of this invention is the realization of an orally absorbable form of progesterone which, as stated, has been hitherto unknown. Thus, this form of progesterone can be used for all purposes in which only parenteral progesterone formulations have been successful to date. In addition, it would be especially valuable as a means of controlling pregnancy. Previously, due to inability of mammals to absorb orally administered progesterone, it has been necessary to employ synthetic progestational agents which are orally absorbable. These agents are thought to cause unwanted side effects. Now it is possible to produce an orally absorbable progesterone and therefore use of such synthetic progestational agents can be avoided in orally administered birth control preparations.

The following specific embodiments exemplify the surprisingly effective operation of this invention.

EXAMPLE 1

In a suitable vessel was placed 10 parts Pluronic F-68 nonionic surfactant, 30 parts progesterone N.F. and 60 parts polyethylene glycol, molecular weight about 6,000. The mixture was heated to about 60°C and was melted, forming a clear solution. This solution was poured on a glass plate and was solidified by cooling. The resultant solid was ground into a powder which was tested as follows:

Both 10 µg. and 33.3 µg. progesterone solid dosage gelatin capsules were prepared by combining the proper amount of the powdered melt described above with 150 mg. of lactose and filling into No. 4 hard gelatin capsules. A corresponding set of capsules was prepared by replacing the melt with a physical mixture of the melt ingredients. Capsules containing only progesterone and lactose at progesterone levels of 10.0 µg., 33.3 µg. and 100.0 µg. were also prepared. The control capsules contained only lactose. These capsules were orally administered at the rate of 1 per day for 5 days to immature female rabbits, previously primed with estrogen for 6 days. The immature rabbit uteri were examined, using the McPhail Test; T. Miyake, "Progestational Substances; Methods in Hormone Research," Vol. II, pp. 135–136, 1962, Academic Press, New York. The McPhail Test employs a scale of from about 0 to 4+ as a measure of progestational endometrial proliferation.

The following table compares the control rabbits receiving no progesterone in any form with those receiving conventional progesterone, those receiving the powdered progesterone-polyethylene glycol (PEG) melt, prepared as described above, and those receiving a dry mix of progesterone Pluronic F-68 and PEG.

| Rabbit No. | Compound and Dose Level µg./Rabbit/Day | McPhail Grading Scale |
|---|---|---|
| I 17 | Control (estrogen-primed only)—0 | 0 |
| C 11 | Control (estrogen-primed only)—0 | 0 |
| C 16 | Control (estrogen-primed only)—0 | 0 |
| D 14 | Progesterone-PEG-Surfactant dry mix—10.0 | 0 |
| F 17 | Progesterone-PEG-Surfactant dry mix—10.0 | 0 |
| G 16 | Progesterone-PEG-Surfactant dry mix—10.0 | 0 |
| H 14 | Progesterone-PEG-Surfactant dry mix—33.3 | 0 |
| H 13 | Progesterone-PEG-Surfactant dry mix—33.3 | 0 |
| I 11 | Progesterone-PEG-Surfactant dry mix—33.3 | 0 |
| I 12 | Progesterone—10.0 | 0 |
| C 19 | Progesterone—10.0 | 0 |
| D 15 | Progesterone—10.0 | 0 |
| D 11 | Progesterone—33.3 | 0 |
| D 17 | Progesterone—33.3 | 0 |
| F 14 | Progesterone—33.3 | 0 |
| C 15 | Progesterone—100.0 | 0 |
| E 19 | Progesterone—100.0 | 0 |
| F 16 | Progesterone—100.0 | 0 |
| H 15 | Progesterone-PEG-Surfactant melt—10.0 | + |
| I 15 | Progesterone-PEG-Surfactant melt—10.0 | +++ |
| I 19 | Progesterone-PEG-Surfactant melt—10.0 | ++ |
| G 17 | Progesterone-PEG-Surfactant melt—33.3 | + |
| H 11 | Progesterone-PEG-Surfactant melt—33.3 | 0 |
| E 12 | Progesterone-PEG-Surfactant melt—33.3 | +++ |

As is evident from the above table, the uteri of 5 out of 6 animals receiving the melt showed progestational proliferation.

EXAMPLE 2

Employing the proposed U.S.P. XVIII dissolution rate apparatus, the dissolution rates of various phenylbutazone capsule formulations were determined. The solvent employed was pH.7.5 buffer with pancreatin. Each capsule contained 100 mg. of phenylbutazone or its equivalent amount of sodium salt (where indicated).

| | Capsule Formation | Time to Dissolve 50% (min.) | Time to Dissolve 90% (min.) |
|---|---|---|---|
| (1) | phenylbutazone plus lactose | 39 | 63 |
| (2) | phenylbutazone 30% w/w PEG 4000-60% w/w Pluronic F-68-10% w/w (physical mixture or melt) | 18 | 26 |
| (3) | sodium phenylbutazone plus lactose | 35 | 73 |
| (4) | sodium phenylbutazone 30% w/w PEG 6000-60% w/w Pluronic F-68-10% w/w | 13 | 18 |

EXAMPLE 3

Dissolution of the above capsule formulations was determined as in Example 1 except that 0.1 N HCl was used as the solvent. Because of the low solubility of phenylbutazone in 0.1 N HCl, the data is reported as time required to reach saturation (TS).

| System of Example 2 | TS |
|---|---|
| (1) | >>30 min. |
| (2) | 10–12 min. (temporary supersaturation observed) |
| (3) | >>30 min. |
| (4) | 10–12 min. (temporary supersaturation observed) |

EXAMPLE 4

Dissolution rates of the following systems were determined as in Example 2.

| | Capsule Formation | | Time to Dissolve 50% (min.) | Time to Dissolve 90% (min.) |
|---|---|---|---|---|
| | | | % Dissolved in | |
| | | | 20 Min. | 30 Min. |
| 1. | N-(1-adamantanoyl)-0-aminophenylacetic acid | | 25 | 38 |
| 2. | N-(1-adamantanoyl)-0-aminophenylacetic acid | -30% w/w ) | 60 | 83 |
| | Pluronic F-68 | -10% w/w ) Physical | | |
| | | ) Mixture | | |
| | PEG 4000 | -60% w/w ) | | |

I claim:

1. A method of enhancing progestational endometrial proliferation upon orally absorbing progesterone, which comprises administering to a female an effective amount of a composition comprising about 30 percent by weight of progesterone in a solid molecular dispersion molten from (a) between 35 and 90 percent of polyethyleneglycol of molecular weight 1,000 to 20,000 and (b) between 1 and 50 percent of the total weight of a polycondensate of the formula

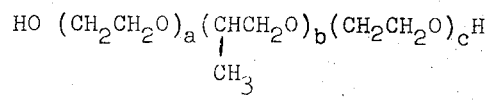

of which the average molecular weight is about 8,200 and wherein the ethylene oxide occupies 80 to 90 percent of the polycondensate.

2. A method according to claim 1 wherein the proportion of progesterone to surfactant to polyethyleneglycol is about 30:10:60 parts by weight, respectively.

3. A method according to claim 1 wherein the polyethylene glycol has a molecular weight range of 4,000 to 6,000.

4. A method according to claim 3 wherein the surfactant is a condensate of ethylene oxide with a hydrophobic condensate of propylene oxide and propyleneglycol.

5. A method according to claim 4 wherein the progesterone, polyethyleneglycol and surfactant are melted to form a clear solution, which is then solidified by cooling.

* * * * *